United States Patent
Lai

(10) Patent No.: US 6,776,934 B2
(45) Date of Patent: Aug. 17, 2004

(54) METHOD FOR POLYMERIZING LENSES

(75) Inventor: Yu-Chin Lai, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 122 days.

(21) Appl. No.: 10/001,031

(22) Filed: Nov. 2, 2001

(65) Prior Publication Data

US 2003/0125409 A1 Jul. 3, 2003

(51) Int. Cl.⁷ .............................. C08F 2/50; G02B 1/04; G02B 3/00; B29C 39/00
(52) U.S. Cl. .................... 264/1.36; 264/1.37; 264/1.38; 264/496; 522/18; 522/39; 522/99
(58) Field of Search .............................. 264/1.36, 1.37, 264/1.38, 496; 522/8, 18, 28, 39, 99, 14, 182; 523/106, 107

(56) References Cited

U.S. PATENT DOCUMENTS

| | | | |
|---|---|---|---|
| 3,159,646 A | 12/1964 | Milionis et al. | 260/308 |
| 3,408,429 A | 10/1968 | Wichterle | 264/1 |
| 3,660,545 A | 5/1972 | Wichterle | 264/1 |
| 3,761,272 A | 9/1973 | Mannens et al. | 96/84 R |
| 4,073,577 A | 2/1978 | Hofer | 351/160 |
| 4,197,266 A | 4/1980 | Clark et al. | 264/1 |
| 4,304,895 A | 12/1981 | Loshack | 526/313 |
| 4,496,871 A | 1/1985 | Sumita et al. | 310/324 |
| 4,528,311 A | 7/1985 | Beard et al. | 524/91 |
| 4,716,234 A | 12/1987 | Dunks et al. | 548/259 |
| 4,719,248 A | 1/1988 | Bambury et al. | 523/108 |
| 4,997,897 A | 3/1991 | Melpolder | 526/284 |
| 5,034,461 A | 7/1991 | Lai et al. | 525/100 |
| 5,271,875 A | 12/1993 | Appleton et al. | 264/2.3 |
| 5,314,961 A | 5/1994 | Anton et al. | 525/280 |
| 5,610,252 A | 3/1997 | Bambury et al. | 526/279 |
| 5,891,931 A * | 4/1999 | Leboeuf et al. | 522/64 |
| 5,989,462 A * | 11/1999 | Buazza et al. | 264/1.36 |
| 6,099,123 A * | 8/2000 | Engardio et al. | 351/177 |
| 6,309,585 B1 * | 10/2001 | Zheng | 264/496 |
| 6,402,995 B1 * | 6/2002 | Degawa et al. | |
| 6,414,049 B1 * | 7/2002 | Alli et al. | 522/84 |
| 6,419,873 B1 * | 7/2002 | Buazza et al. | 264/496 |
| 6,465,538 B2 * | 10/2002 | Lai | 522/64 |
| 2003/0176521 A1 * | 9/2003 | Jethmalani et al. | 522/46 |
| 2003/0183960 A1 * | 10/2003 | Buazza et al. | 264/1.38 |

FOREIGN PATENT DOCUMENTS

| | | |
|---|---|---|
| EP | 0131468 A | 1/1985 |
| WO | WO 99/06199 * | 2/1999 |
| WO | 99/60427 | 11/1999 |

* cited by examiner

Primary Examiner—Susan Berman
(74) Attorney, Agent, or Firm—John E. Thomas

(57) ABSTRACT

A method for photopolymerizing a monomer mixture to form a lens involves photopolymerizing a mixture of lens-forming monomers that includes an initiator of the formula:

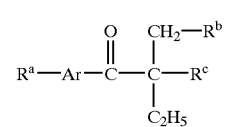

wherein:
 Ar represents an aromatic radical;
 $R^a$ represents a secondary amino radical;
 $R^b$ represents an ethylenically unsaturated radical or an aromatic radical; and
 $R^c$ represents a secondary amino radical.

17 Claims, No Drawings

METHOD FOR POLYMERIZING LENSES

BACKGROUND OF THE INVENTION

The present invention relates to a method for photopolymerizing a monomer mixture of lens-forming monomers to form a lens, such as a contact lens or an intraocular lens. The monomer mixture is cured by exposure to a light source including light in the visible region of the spectrum. Alternately, the monomer mixture is cured by exposure to a UV radiation source even when the monomer mixture includes a UV-absorbing compound.

Lenses such as contact lenses or intraocular lenses may include a UV absorbing agent in the lens to absorb light in the ultraviolet region of the spectrum, more particularly, to absorb light in the region of about 200 to 400 nm and, especially, about 290 to 400 nm. Representative UV absorbing materials for such lens applications are described in U.S. Pat. No. 4,304,895 (Loshaek), U.S. Pat. No. 4,528,311 (Beard et al.) and U.S. Pat. No. 4,719,248 (Bambury et al.).

Generally, such lenses are formed by free radical polymerization of a monomer mixture including desired lens-forming monomers, usually in the presence of heat (thermal polymerization) or a light source (photopolymerization). One particular method for producing contact lenses involves thermal polymerization of the initial monomeric mixture in tubes in a heated water bath to provide rod-shaped articles, which rods are then cut into buttons, the buttons then being lathed into contact lenses; such methods for forming lenses including a UV absorbing agent are illustrated in the aforementioned U.S. Pat. Nos. 4,304,895 (Loshaek) and 4,528,311 (Beard et al.). Other methods involve casting the lenses directly in molds, wherein the monomer mixture is charged to the mold and polymerized by exposure to ultraviolet (UV) radiation.

Among photopolymerization processes, UV curing (i.e., exposure of the monomer mixture to radiation mainly in the ultraviolet region) of the monomer mixtures has proved very effective. However, for lenses including a UV absorbing agent, problems are encountered when attempting to cure the monomer mixtures since this agent absorbs UV light, thus diminishing the amount of UV light available to effect polymerization and resulting in ineffective or uneven curing of the monomer mixture.

It is also possible to effect photopolymerization using a light source also including light in the visible region of the spectrum, although light in this region is generally less efficient in effecting polymerization of conventional lens-forming monomer mixtures than UV curing. It would be desirable to provide a method whereby lenses including a UV absorbing agent can be effectively photopolymerized by free radical polymerization employing light energy in the visible region of the spectrum or UV radiation.

SUMMARY OF THE INVENTION

The invention provides a method for photopolymerizing a mixture of lens-forming monomers to form a lens. In addition to the lens-forming monomers, this mixture comprises an initiator of the formula:

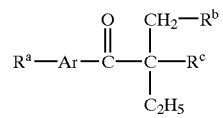

wherein:

Ar represents an aromatic radical;

$R^a$ represents a secondary amino radical;

$R^b$ represents an ethylenically unsaturated radical or an aromatic radical; and $R^c$ represents a secondary amino radical.

The monomer mixture is exposed to polymerization-inducing radiation, particularly visible light or UV radiation, to cure the monomer mixture. The monomer mixture may be charged to a mold having a molding cavity with a desired lens shape and cured therein. The method is useful for monomer mixtures that include a UV-absorbing compound.

DETAILED DESCRIPTION OF PREFERRED EMBODIMENTS

The monomer mixtures employed in the invention include conventional lens-forming monomers. The lens-forming monomers are monomers that are polymerizable by free radical polymerization, generally including an activated unsaturated radical, and most preferably an ethylenically unsaturated radical. (As used herein, the term "monomer" denotes relatively low molecular weight compounds that are polymerizable by free radical polymerization, as well as higher molecular weight compounds also referred to as "prepolymers", "macromonomers", and related terms.)

One preferred class of lens-forming monomers are those that form hydrogel copolymers. A hydrogel is a crosslinked polymeric system that can absorb and retain water in an equilibrium state. Accordingly, for hydrogels, the monomer mixture will typically include a hydrophilic monomer. Suitable hydrophilic monomers include: unsaturated carboxylic acids, such as methacrylic and acrylic acids; acrylic substituted alcohols, such as 2-hydroxyethylmethacrylate (Hema) and 2-hydroxyethylacrylate; vinyl lactams, such as N-vinyl pyrrolidone; and acrylamides, such as methacrylamide and N,N-dimethylacrylamide (DMA).

Another preferred class of lens-forming monomers are those that form silicone copolymers. Such systems include a silicone-containing monomer. One suitable class of silicone containing monomers include known bulky, monofunctional polysiloxanylalkyl monomers represented by Formula (I):

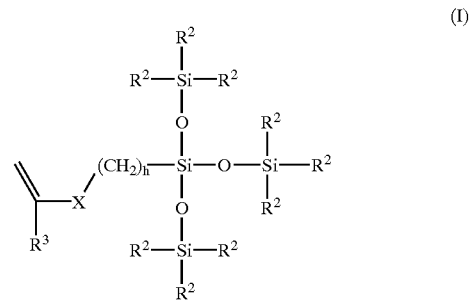

X denotes —COO—, —CONR⁴—, —OCOO—, or —OCONR⁴— where each where R⁴ is H or lower alkyl; R³ denotes hydrogen or methyl; h is 1 to 10; and each R² independently denotes a lower alkyl or halogenated alkyl radical, a phenyl radical or a radical of the formula

wherein each $R^5$ is independently a lower alkyl radical or a phenyl radical. Such bulky monomers specifically include methacryloxypropyl tris(trimethylsiloxy)silane, pentamethyldisiloxanyl methylmethacrylate, tris(trimethylsiloxy)

methacryloxy propylsilane, methyldi(trimethylsiloxy) methacryloxymethyl silane, 3-[tris(trimethylsiloxy)silyl] propyl vinyl carbamate, and 3-[tris(trimethylsiloxy)silyl] propyl vinyl carbonate.

Another suitable class are multifunctional ethylenically "end-capped" siloxane-containing monomers, especially difunctional monomers represented Formula (II):

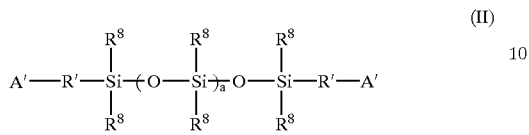

(II)

wherein:
each A' is independently an activated unsaturated group;
each R' is independently are an alkylene group having 1 to 10 carbon atoms wherein the carbon atoms may include ether, urethane or ureido linkages therebetween;
each $R^8$ is independently selected from monovalent hydrocarbon radicals or halogen substituted monovalent hydrocarbon radicals having 1 to 18 carbon atoms which may include ether linkages therebetween, and
a is an integer equal to or greater than 1. Preferably, each $R^8$ is independently selected from alkyl groups, phenyl groups and fluoro-substituted alkyl groups. It is further noted that at least one $R^8$ may be a fluoro-substituted alkyl group such as that represented by the formula:

—D'—$(CF_2)_s$—M' wherein:
D' is an alkylene group having 1 to 10 carbon atoms wherein said carbon atoms may include ether linkages therebetween;
M' is hydrogen, fluorine, or alkyl group but preferably hydrogen; and
s is an integer from 1 to 20, preferably 1 to 6.

With respect to A', the term "activated" is used to describe unsaturated groups which include at least one substituent which facilitates free radical polymerization, preferably an ethylenically unsaturated radical. Although a wide variety of such groups may be used, preferably, A' is an ester or amide of (meth)acrylic acid represented by the general formula:

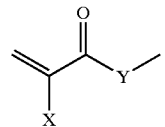

wherein X is preferably hydrogen or methyl, and Y is —O— or —NH—. Examples of other suitable activated unsaturated groups include vinyl carbonates, vinyl carbamates, fumarates, fumaramides, maleates, acrylonitryl, vinyl ether and styryl. Specific examples of monomers of Formula (II) include the following:

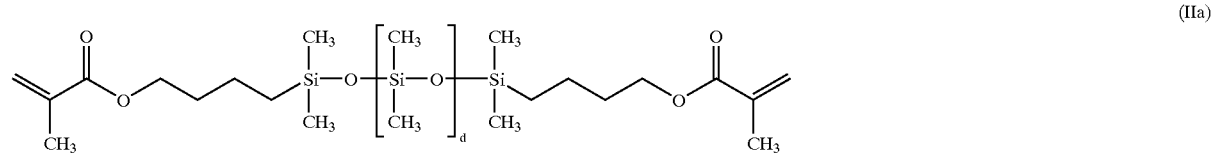

(IIa)

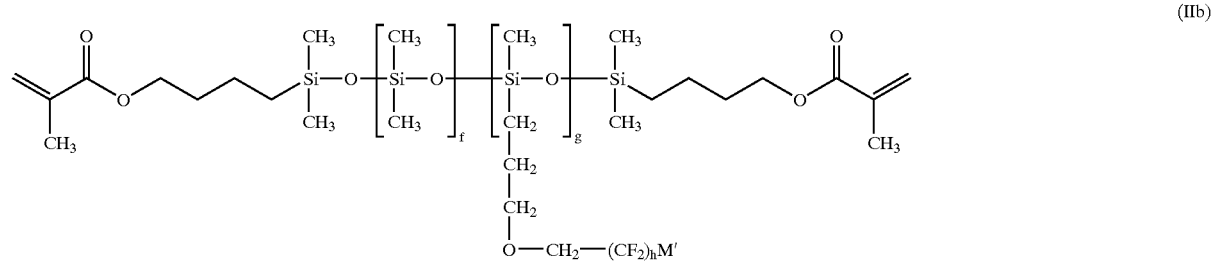

(IIb)

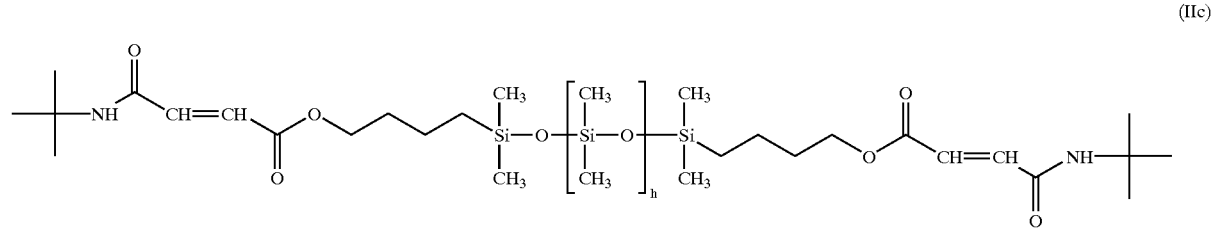

(IIc)

wherein:
d, f, g and k range from 0 to 250, preferably from 2 to 100;
h is an integer from 1 to 20, preferably 1 to 6; and
M' is hydrogen or fluorine.

A further suitable class of silicone-containing monomers includes monomers of the Formulae (IIIa) and (IIIb):

E'(*D*A*D*G)$_a$*D*A*D*E';   (IIIa)

or

E'(*D*G*D*A)$_a$*D*G*D*E';   (IIIb)

wherein:
D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of the formula:

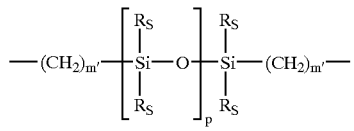

wherein:

each $R^z$ independently denotes an alkyl or fluoro-substituted alkyl group having 1 to 10 carbon atoms which may contain ether linkages between carbon atoms;

m' is at least 1; and p is a number which provides a moiety weight of 400 to 10,000;

each E' independently denotes a polymerizable unsaturated organic radical represented by the formula:

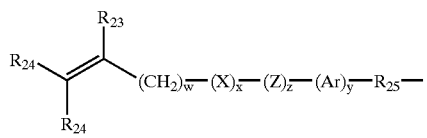

wherein:

$R_{23}$ is hydrogen or methyl;

$R_{24}$ is hydrogen, an alkyl radical having 1 to 6 carbon atoms, or a —CO—Y—$R_{26}$ radical wherein Y is —O—, —S— or —NH—;

$R_{25}$, is a divalent alkylene radical having 1 to 10 carbon atoms; $R_{26}$ is a alkyl radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A specific urethane monomer is represented by the following:

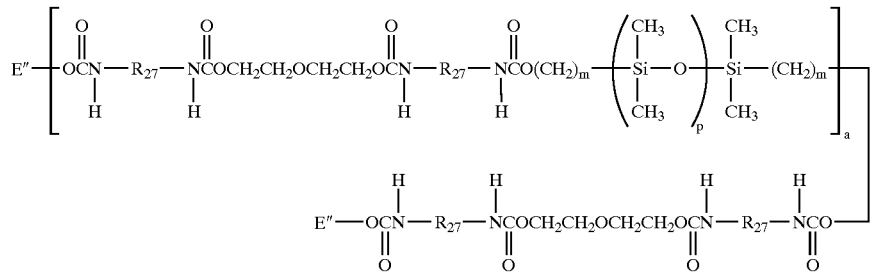

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E'' is a group represented by:

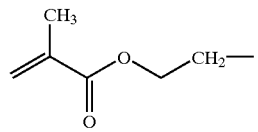

Other silicone-containing monomers include the silicone-containing monomers described in U.S. Pat. Nos. 5,034,461, 5,610,252 and 5,496,871, the disclosures of which are incorporated herein by reference. Other silicone-containing monomers are well-known in the art.

In the case of silicone hydrogels, the monomer mixture includes, in addition to the silicone-containing monomer, a hydrophilic monomer. Either the silicone-containing monomer or the hydrophilic monomer may function as a crosslinking agent (a crosslinker being defined as a monomer having multiple polymerizable functionalities) or a separate crosslinker may be employed.

In the case of intraocular lenses, the monomer mixtures may further include a monomer for increasing the refractive index of the resultant copolymer. Examples of such monomers are aromatic (meth) acrylates, such as phenyl (meth) acrylate, phenylethyl (meth)acrylate and benzyl (meth) acrylate.

Another class of monomer materials especially suited for intraocular lenses are silicone-containing monomers having a relatively high refractive index. An example are monomeric materials of the formula (IV):

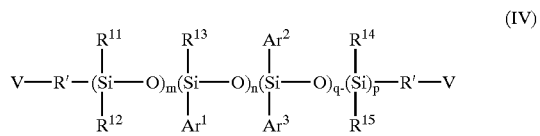

(IV)

wherein:

each V is independently an activated unsaturated group (similar to the A' radicals of formula (II));

each R' is independently an alkylene group having 1 to 10 carbon atoms wherein the carbon atoms may include ether linkages therebetween each of $R^{11}$–$R^{15}$ is independently an alkyl group or haloalkyl group having 1 to 18 carbon atoms which may include ether linkages therebetween;

each of $Ar^1$–$Ar^3$ is an aromatic group, especially a phenyl, alkylenephenyl, or phenylalkyl group;

each of m, n, p and q is zero or an integer;

n+q is at least 1, preferably an integer of at least 2;

and m+n+p+q preferably provides the prepolymer with a molecular of at least 500, preferably at least 1000.

The monomer mixtures preferably include a UV-absorbing agent, defined as an agent that, when incorporated in the final lens, is capable of reducing transmittance of at least 70% percent of light in the region of 200 to 400 nm, more preferably at least 70% of light in the region of 320 to 400 nm and at least 90% of light in the region of 290 to 320 nm. The invention is suitable for monomer mixtures including any conventional UV absorbing agent. One general class of such agents are non-polymerizable absorbers such as 2,2-drihydoxy-4,4-dimethoxy-benzophenone, and 2,2-dihydoxy-4-methoxy-benzophenone. Preferred, however, are polymerizable UV absorbing agents that include an activated unsaturated group that is reactive with the lens-forming monomers, whereby the UV absorbing agent is copolymerized with the lens-forming monomers. Representative polymerizable UV absorbing materials for such lens applications are described in U.S. Pat. No. 4,304,895 (Loshaek), U.S. Pat. No. 4,528,311 (Beard et al.), U.S. Pat. No. 4,716,234 (Dunks et al.), U.S. Pat. No. 4,719,248 (Bambury et al.), U.S. Pat. No. 3,159,646 (Milionis et al.) and U.S. Pat. No. 3,761,272 (Manneus et al.), the disclosures of which are incorporated herein by reference. Specific examples include: benzotriazole-containing monomers such as 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole; and the polymerizable benzophenones described in U.S. Pat. No. 4,304,895.

The monomer mixtures may also include a tinting agent, defined as an agent that, when incorporated in the final lens, imparts some degree of color to the lens. The invention is applicable to conventional tinting agents known in the art, including non-polymerizable agents, or polymerizable agents that include an activated unsaturated group that is reactive with the lens-forming monomers. One example of this latter class is the compound 1,4-bis(4-(2-methacryloxyethyl)phenylamino)anthraquinone, a blue visibility-tinting agent disclosed in U.S. Pat. No. 4,997,897.

As mentioned, photopolymerization of monomer mixtures to form lenses by UV curing has proved very effective, however, for lenses including a UV absorbing agent, ineffective or uneven curing is encountered since this agent absorbs UV light. The invention provides a method whereby lenses including a UV absorbing agent can be effectively photopolymerized by free radical polymerization.

More specifically, it was found that the subject initiators permitted satisfactory curing of lens-forming monomer mixtures by photopolymerization, even when the monomer mixtures include a UV absorbing agent. These initiators may be represented by the formula (V):

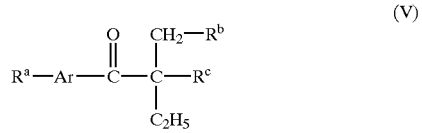

(V)

wherein:
Ar represents an aromatic radical;
$R^a$ represents a secondary amino radical;
$R^b$ represents an ethylenically unsaturated radical or an aromatic radical; and $R^c$ represents a secondary amino radical.
Representative Ar radicals include phenylene, alkylenephenylene and phenylenealkyl. Representative $R^a$ and $R^c$ radicals include dimethylamino and morpholino. Representative $R^b$ radicals include vinyl, phenyl and naphthalenyl.
A specific example is the compound where Ar is phenylene, $R^a$ is morpholino, $R^b$ is phenyl, and $R^c$ is dimethylamino (2-benzyl-2-dimethylamino-1-(4-morpholinophenyl)-butan-1-one). This compound is commercially available under the tradename Irgacure-369™ (Ciba Specialty Chemicals). These initiators will generally be employed at 0.01 to 5 weight percent of the monomer mixture, and more generally at 0.1 to 2 weight percent.

Generally, the monomer mixtures may be charged to a mold, and then subjected to the light radiation to effect curing of the monomer mixture in the mold. Various processes are known for curing a monomeric mixture in the production of contact lenses, including spincasting and static casting. Spincasting methods involve charging the monomer mixture to a mold, and spinning the mold in a controlled manner while exposing the monomer mixture to light. Static casting methods involve charging the monomer mixture between two mold sections, one mold section shaped to form the anterior lens surface and the other mold section shaped to form the posterior lens surface, and curing the monomer mixture by exposure to light. Such methods are described in U.S. Pat. Nos. 3,408,429, 3,660,545, 4,113,224, 4,197,266, and 5,271,875. Additionally, the monomer mixtures may be cast in the shape of rods or buttons, which are then lathe cut into a desired lens shape.

For the present invention, selection of the specific light or radiation source is not critical. Various sources of UV lamps and visible light lamps for photopolymerization are commercially available. Generally, the term "UV radiation source" and like terms denote a source that provides radiation mainly in the range of 300 to 400 nm. The term "visible light source" or like terms denote a source that provides radiation mainly in the range of 400 to 500 nm. When using a visible light source, in some cases it may be desirable to filter out radiation in the ultraviolet region of the spectrum, especially light in the region of 300 to 400 nm. In such a case, if desired, a UV-blocking agent may be incorporated in the mold material of the molds used to cast the lens.

The following examples illustrate various preferred embodiments.
Section A—Prepolymer Synthesis

EXAMPLE 1

Preparation of Hydroxybutyl-Terminated Copolymer of Dimethylsiloxane and Diphenylsiloxane 1,3-bis(hydroxybutyl)tetramethyl disiloxane (33.70 g, 0.118 mole), dimethyldimethoxysilane (403.18 g, 3.25 moles) and diphenyldimethoxysilane (272.33 g, 1.08 moles) were added in a one-liter round bottom flask. Water (78.29 g) and concentrated hydrochloric acid (11.9 mL) were then slowly added to the flask. The contents of the flask were refluxed for one hour. Methanol (253.3 mL) was distilled from the contents. Water (160 mL) and concentrated hydrochloric acid (130 mL) was added to the flask. The contents of the flask were refluxed for one hour. The contents of the flask were then poured into a separatory funnel. The silicone layer was separated, diluted with 500 mL ether and washed once with 250 mL water, twice with 250 mL 5-percent sodium bicarbonate aqueous solution and twice with 250 mL water. The final organic layer was dried with magnesium sulfate, and then vacuum stripped at 80 degrees Celsius (0.1 mm Hg) to give the crude product. The crude product was then dissolved in 50/50 cyclohexane/methylene chloride and then passed through a silica gel column with the same solvent mixture. The final product was collected in tetrahydrofuran (THF) by passing THF through the silica gel column. The THF fractions were combined, dried and vacuum stripped to give the final product. Size Exclusion Chromatography (SEC) measurements of the final product indicated less than three percent cyclics and a molecular weight of 2821 by titration.

EXAMPLE 2
Preparation of a Prepolymer of Formula (IV)

A 500-mL round bottom flask equipped with reflux condenser and nitrogen blanket was charged with isophorone diisocyanate (5.031 g, 0.0227 mole), the hydroxybutyl-terminated copolymer of dimethylsiloxane and the diphenylsiloxane from Example 1 (51.4465 g, 0.0189 mole), dibutyltin dilaurate (0.1811 g) and methylene chloride (150 mL). The flask contents were refluxed. After about 90 hours of reflux, the isocyanate was found decreased to 16.2 percent (theoretical 16.7 percent) of original. The contents of the flask were allowed to cool to ambient temperature. HEMA (1.1572 g) and 1,1'-2-bi-naphthol (5.7 mg) were added to the flask and stirred. After seven days, NCO peak disappeared from IR spectrum and the reaction was terminated. The product was obtained at quantitative yield after removing solvent.

EXAMPLE 3
Preparation of Hydroxybutyl-Terminated Polymethylsiloxane (Fifty Percent Phenyl Content)

1,3-bis(hydroxybutyl)tetramethyldisiloxane (13.18 g, 0.474 mole) and dimethoxy phenylmethylsilane (238.08 g, 1.306 moles) were added to a one-liter round bottom flask. Water (23.58 g or 1.31 mole) and concentrated hydrochloric acid (4.8 mL) were then slowly added to the flask and the contents refluxed at 70 degrees Celsius for one hour. After refluxing, methanol (69.2 g) was distilled from the flask and 44 mL of water and 44 mL of concentrated hydrochloric acid were added to the reaction mixture. The contents of the flask were then refluxed for 3.5 hours prior to being poured into a separatory funnel. The silicone layer was separated, diluted with 500-mL ether and washed twice with 100-ml water, twice with 100 mL five percent sodium bicarbonate aqueous solution and twice with 250-mL water. The final organic layer was dried with magnesium sulfate, and then vacuum stripped at 80 degrees Celsius (0.1 mm Hg) to give a clear viscous crude product. The crude product was then purified by silica gel column chromatography using the same method as described in Example 1 above. The THF solutions containing product were combined and dried with magnesium sulfate. The solvent was vacuum stripped to give the final product. The molecular weight of the final product as determined by titration was 2,697.

EXAMPLE 4
Preparation of a Prepolymer of Formula (IV)

The procedure and feed ratio of components used in the present example were the same as those of Example 2 above, except the hydroxybutyl terminated polymethylphenylsiloxane copolymer of Example 3 was substituted for the copolymer of Example 1.

EXAMPLE 5
Preparation of Hydroxybutyl-Terminated Copolymer of Dimethylsiloxane and Diphenylsiloxane (27:9 Ratio of Methyl/Phenyl and MW About 4000)

The preparation procedure, ingredients and ingredient feed ratio used in the present example were the same as those of Example 1, except preparative SEC was used to purify the crude product. In so doing, the crude product was dissolved in THF (10% w/v) and passed through a preparative SEC unit. The final product, after stripping off all solvent, was over 97 percent pure, with less than 3 percent cyclic impurities. The molecular weight of the final product as determined by titration was 4158.

EXAMPLE 6
Preparation of Prepolymer of Formula (IV) (Polysiloxane Containing Both Dimethylsiloxane and Diphenylsiloxane with 25 Percent Phenyl Units)

The procedure employed in the present example was the same as that described in Example 2 above, except the feedstock was isophorone diisocyanate/copolymer of Example 5/HEMA at a molar ratio of 4.5:3.5:2.0. The isocyanate content before adding the HEMA was 18.5 percent.

EXAMPLE 7
Preparation of Hydroxybutyl-Terminated Copolymer of Dimethylsiloxane and Phenylmethylsiloxane (3:1 Ratio of Total Methyl to Phenyl Attached to Silicon and MW About 4000)

In the present example, the same procedure was employed as that of Example 1, except that the amounts of ingredients varied. In the present example, 4-bis(4-hydroxybutyl) tetramethyldisiloxane (19.08 g, 0.0686 mole), dimethoxy-dimethylsilane (151.67 g, 1.223 mole) and dimethoxyphenylmethylsilane (222.24 g, 1.219 mole) were used. The crude product, after drying, was passed through a preparative SEC column with a 10% w/v THF solution (190 mL inject). The purified product was over 97 percent pure with a molecular weight of 4490.

EXAMPLE 8
Preparation of Prepolymer of Formula (IV) (Polysiloxane Containing Both Dimethylsiloxane and Phenylmethylsiloxane Having 25 Percent Total Phenyl Units (2 Blocks of Silicone))

The procedure of the present example was the same as that described in Example 12 below, except the feedstock was isophorone diisocyanate/copolymer of Example 7/HEMA at a molar ration of 3:2:2.

EXAMPLE 9
Preparation of Prepolymer of Formula (IV) (Polysiloxane Containing Both Dimethylsiloxane and Phenylmethylsiloxane Having 25 Percent Total Phenyl Units (1 Block of Silicone))

The procedure of the present example was the same as that described in Example 2 above, except the feedstock was isophorone diisocyanate/copolymer of Example 7/HEMA at a molar ration of 2:1:2.

EXAMPLE 10
Preparation of Prepolymer of Formula (IV) (Polysiloxane Containing Both Dimethylsiloxane and Phenylmethylsiloxane Having 25 Percent Total Phenyl Units (3 Blocks of Silicone))

The procedure of the present example was the same as that described in Example 2 above, except the feedstock was isophorone diisocyanate/copolymer of Example 7/HEMA at a molar ration of 4:3:2.

Section B—Film Production

The following nomenclature is used in the description of experimental procedures:

BzA—benzylacrylate

BzMA—benzylmethacrylate
DMA—N,N-dimethylacrylamide
Irgacure-184™—(I-184) a commercial acetophenone-based initiator (Ciba Specialty Chemical), based on 1-hydroxycyclohexyl phenyl ketone
Irgacure-369™—(I-369) a commercial initiator of Formula (V) described above (Ciba Specialty Chemical)
Irgacure-651™—(I-651) a commercial acetophenone-based initiator (Ciba Specialty Chemical), based on 2-dimethoxy-2-phenylacetophenone
Irgacure-819™—(I-819) a commercial initiator based on bis(2,4,6-trimethylbenzoyl) phenylphosphine oxide (Ciba Specialty Chemical),
UV Agent—2-(2-hydroxy-5-methacrylamidophenyl)-5-methoxybenzotriazole (Example 4 of U.S. Pat. No. 4,719,248)

EXAMPLE 11

A series of monomer mixtures, suitable for providing silicone intraocular lenses, were prepared by mixing the components in Table 1, along with 20 parts by weight (pbw) of hexanol solvent. The amounts listed are parts by weight.

These monomer mixtures were cured between two silane-treated glass plates under an ultraviolet (UV) light source with an intensity of 300 microwatts for 2 hours. The cured films were then released, extracted in isopropanol for over 4 hours and dried in a vacuum oven at 70° C. overnight. The films without extractables were dried in air. The dried films were soaked in a borate buffered saline solution overnight before characterization. All films had a thickness of 170–200 microns. Tensile tests were performed in borate buffered saline according to ASTM D-1708. The results are set forth in Table 1.

TABLE 1

|  | Example | | |
|---|---|---|---|
|  | 11 | C-1 | C-2 |
| Prepolymer Ex. 6 | 65 | 65 | 65 |
| BzA | 15 | 15 | 15 |
| BzMA | 15 | 15 | 15 |
| DMA | 5 | 5 | 5 |
| UV Agent | 0.25 | 0.25 | 0.25 |
| I-369 | 1 | — | — |
| I-819 | — | 1 | — |
| I-651 | — | — | 1 |
| % Extractables | 13.2% | 15.1% | — |
| % Water | 0.5% | 0.5% | — |
| Modulus g/mm$^2$ | 1841 | 2176 | — |
| (Std Dev) | (262) | (499) | — |
| % Elongation | 309% | 320% | — |

The results from Example 11 indicate that the initiator of formula (V) employed in Example 11 was effective for UV-curing of lens-forming monomer mixtures, even when the monomer mixture included a UV-absorbing agent. This initiator was as effective as similar monomer mixtures including I-819, employed in Example C-1. In contrast, similar monomer mixtures including I-651 stayed fluid and were not effectively cured.

EXAMPLE 12

The same batch of monomer mixture as Example 11 was cured employing a blue light source instead of a UV light source. The films were effectively cured, and had the following physical properties: modulus 1806(18) g/mm$^2$; and percent elongation 321(18)%. This data indicates that the initiator of formula (V) was suitable for both UV curing and visible light curing of mixtures of lens-forming monomers.

EXAMPLE 13

The monomer mixtures listed in Table 2 were prepared by mixing by mixing the components in Table 1, along with 20 parts by weight (pbw) of hexanol solvent. The amounts listed are parts by weight. These monomer mixtures were cured between two silane-treated glass plates under a blue light source, as in Example 12, and the cured films were processed as in Examples 11 and 12. The results are set forth in Table 2.

TABLE 2

|  | Example | | | | |
|---|---|---|---|---|---|
|  | 13A | 13B | 13C | 13D | 13E |
| Prepolymer Ex. 2 | 50 | — | — | — | — |
| Prepolymer Ex. 6 | — | 50 | — | — | — |
| Prepolymer Ex. 8 | — | — | 50 | — | — |
| Prepolymer Ex. 9 | — | — | — | 50 | — |
| Prepolymer Ex. 10 | — | — | — | — | 50 |
| BzA | 20 | 20 | 20 | 20 | 20 |
| BzMA | 10 | 10 | 10 | 10 | 10 |
| DMA | 20 | 20 | 20 | 20 | 20 |
| UV Agent | 0.25 | 0.25 | 0.25 | 0.25 | 0.25 |
| I-369 | 1 | 1 | 1 | 1 | 1 |
| % Extractables | 15.6 | 14.4 | 11.6 | 8.4 | 13.1 |
| % Water | 11.7 | 10.5 | 7.8 | — | — |
| Modulus g/mm$^2$ | 94 | 131 | 108 | 279 | 115 |
| (Std Dev) | (8) | (41) | (7) | (26) | (9) |
| % Elongation | 438 | 415 | 346 | 222 | 290 |

EXAMPLE 14

The monomer mixtures listed in Table 3 were prepared and cured as in Example 13, the monomer mixtures including 20 pbw hexanol solvent. The results are set forth in Table 3.

TABLE 3

|  | Example | | | | | |
|---|---|---|---|---|---|---|
|  | 13A | 13B | 13C | 13D | 13E | 13F |
| Prepolymer Ex. 2 | 90 | — | — | — | — | — |
| Prepolymer Ex. 4 | — | 90 | — | — | — | — |
| Prepolymer Ex. 6 | — | — | 90 | — | — | — |
| Prepolymer Ex. 8 | — | — | — | 90 | 85 | 85 |
| BzA | — | — | — | — | 5 | — |
| BzMA | 5 | 5 | 5 | 5 | 5 | 10 |
| DMA | 5 | 5 | 5 | 5 | 5 | 5 |
| UV Agent | 0.25 | 0.25 | 0.25 | 0.25 | 0.25 | 0.25 |
| I-369 | 1 | 1 | 1 | 1 | 1 | 1 |
| % Extractables | 17.1 | 9.7 | 12.0 | 13.6 | 12.8 | 13.4 |
| % Water | 3.0 | 4.4 | 2.1 | 2.3 | 0.3 | 0 |
| Modulus g/mm$^2$ | 69 | 81 | 81 | 63 | 62 | 104 |
| (Std Dev) | (1) | (4) | (4) | (4) | (15) | (9) |
| % Elongation | 134 | 137 | 132 | 213 | 127 | 203 |

EXAMPLE 15

Intraocular Lens Casting

The monomer mixtures of Example 13E were charged to a two-part mold with molding surfaces shaped to provide an intraocular lens, the monomer mixture being contained in the mold cavity formed between these two molding surfaces. This assembly was then subjected to a UV light source as in Example 11. The two mold sections were separated to recover the intraocular lens, and the lens was clear.

EXAMPLE 16

Contact Lens Casting

The monomer mixtures of Example 13A may be used to cast contact lenses. The monomer mixture is placed on the molding surface of a first plastic mold section, shaped to provide an anterior contact lens surface, and a second plastic mold section having a molding surface shaped to provide a posterior contact lens surface, the monomer mixture being contained in the mold cavity formed between these two molding surfaces. This assembly is subjected to a UV light source as in Example 11, or to a visible light source as in Example 12. Following curing, the two mold sections are separated to recover the contact lens.

Many other modifications and variations of the present invention are possible to the skilled practitioner in the field in light of the teachings herein. It is therefore understood that, within the scope of the claims, the present invention can be practiced other than as specifically described.

I claim:

1. A method comprising:
   providing a monomer mixture comprising a lens-forming monomer, a UV-absorbing agent, and an initiator of the formula:

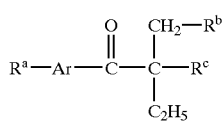
(V)

wherein:
   Ar represents an aromatic radical;
   $R^a$ represents a secondary amino radical;
   $R^b$ represents an ethylenically unsaturated radical or an aromatic radical; and
   $R^c$ represents a secondary amino radical; and
   photopolymerizing said monomer mixture.

2. The method of claim 1, wherein in formula (V), Ar is phenylene, $R^a$ is morpholino, $R^b$ is phenyl, and $R^c$ is dimethylamino.

3. The method of claim 1, wherein the monomer mixture is exposed to light predominantly in the visible region of the spectrum.

4. The method of claim 1, wherein the monomer mixture is exposed to radiation predominantly in the ultraviolet region of the spectrum.

5. The method of claim 1, wherein the monomer mixture is charged to a lens-shaped mold cavity of a mold assembly.

6. The method of claim 5, wherein the mold cavity is formed between a first mold section having a molding surface shaped to provide a posterior contact lens surface and a second mold section having a molding surface shaped to provide an anterior contact lens surface.

7. The method of claim 5, wherein the mold cavity is formed between a first mold section having a molding surface shaped to provide a posterior intraocular lens surface and a second mold section having a molding surface shaped to provide an anterior intraocular lens surface.

8. The method of claim 1, wherein the monomer mixture includes a hydrophilic lens-forming monomer.

9. The method of claim 1, wherein the monomer mixture includes a silicone-containing lens-forming monomer.

10. A method for polymerizing a monomer mixture to form a lens comprising:
    charging to a mold a monomer mixture including lens-forming monomers, a UV-absorbing compound and a polymerization initiator of the formula;

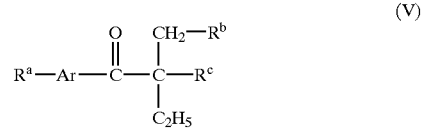
(V)

wherein:
    Ar represents an aromatic radical;
    $R^a$ represents a secondary amino radical;
    $R^b$ represents an ethylenically unsaturated radical or an aromatic radical; and
    $R^c$ represents a secondary amino radical; and
    exposing the monomer mixture in the mold to a light source to cure the monomer mixture in the mold.

11. The method of claim 10, wherein in formula (V), Ar is phenylene, $R^a$ is morpholino, $R^b$ is phenyl, and $R^c$ is dimethylamino.

12. The method of claim 10, wherein the monomer mixture is exposed to light predominantly in the visible region of the spectrum.

13. The method of claim 10, wherein the monomer mixture is exposed to radiation predominantly in the ultraviolet region of the spectrum.

14. The method of claim 10, wherein the lens is a contact lens.

15. The method of claim 14, wherein the mold comprises a mold cavity formed between a first mold section having a molding surface shaped to provide a posterior contact lens surface and a second mold section having a molding surface shaped to provide an anterior contact lens surface.

16. The method of claim 10, wherein the lens is an intraocular lens.

17. The method of claim 10, wherein the monomer mixture includes at least one member selected from the group consisting of a hydrophilic lens-forming monomer, and a silicone-containing lens-forming monomer.

* * * * *